Oct. 6, 1925.
A. J. HALL
ANIMAL TRAP
Filed Nov. 2, 1923
1,555,966
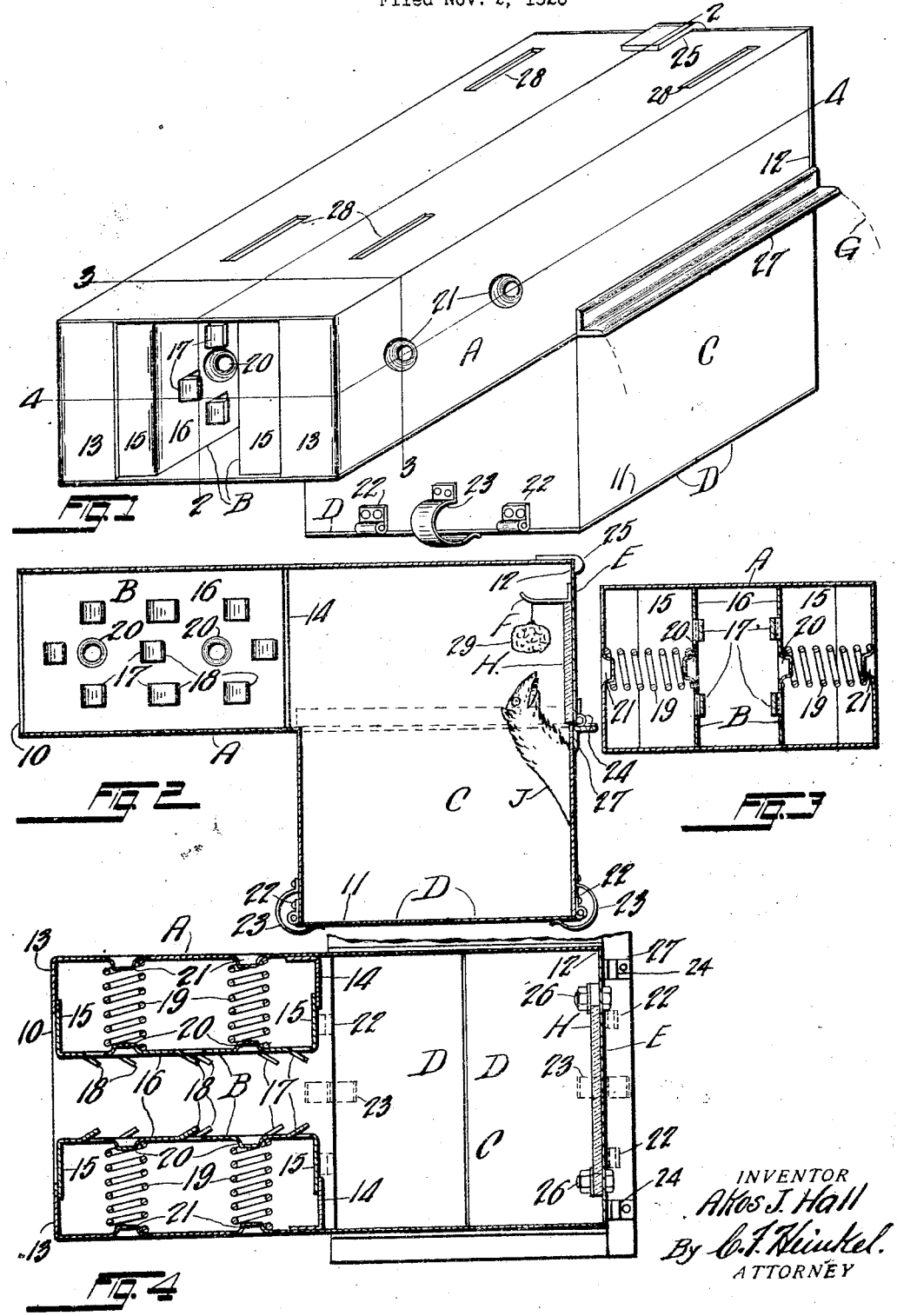
INVENTOR
Akos J. Hall
By C.F. Hinkel.
ATTORNEY Patented Oct. 6, 1925.

1,555,966

UNITED STATES PATENT OFFICE.

AKOS J. HALL, OF CLEVELAND, OHIO.

ANIMAL TRAP.

Application filed November 2, 1923. Serial No. 672,265.

*To all whom it may concern:*

Be it known that I, AKOS J. HALL, a citizen of the United States, residing in Cleveland, county of Cuyahoga, and State of Ohio, have invented a new and useful Improvement in Animal Traps, of which the following is a specification.

My invention relates to apparatus for trapping animals.

The main object of my invention is an animal trap of simple and inexpensive construction, efficient in operation, and adapted to either destroy or preserve animals after they enter the trap. Other objects will appear during the description of the apparatus shown in the accompanying drawing, in which Fig. 1 is a general perspective view of an animal trap constructed according to my invention; Fig. 2 is a section, taken on a longitudinally vertical plane indicated by the line 2—2 in Fig. 1, showing the longitudinal arrangement of the elements; Fig. 3 is a section, taken on a transversely vertical plane indicated by the line 3—3 in Fig. 1, showing the transverse arrangement of the entrance portion of the trap; Fig. 4 is a section, taken on a transversely horizontal plane indicated by the line 4—4 in Fig. 1, showing the transverse arrangement of the elements.

Similar reference characters refer to similar parts throughout the views.

Animal traps, usually, are made to either destroy the animal when caught, or to grasp some part of the animal to hold the same, or to confine the animal in the trap.

It has been found that animals, apparently, leave a certain danger scent in a trap in which they were caught or tortured or killed so that other animals will not enter such a trap thereafter. It has also been found that animals leave a certain track scent when they travel over the ground (as a dog follows a scent for instance).

The present invention takes advantage of the above instincts of animals and eliminates the danger of having animals leave a danger scent in a trap and provides for the production of a track scent in the trap so that animals may readily enter therein.

As will appear presently, my trap leads an animal into confinement in a receptacle independent of the trap which receptacle may either destroy or retain the animal in confinement without permitting the same to re-enter the trap and leave a danger scent but leaves a track scent which will draw other animals into the trap as previously explained.

Referring now particularly to the apparatus shown in the drawing.

The apparatus there shown consists, generally, of a housing having the entrance portion A with two movable walls B therein, of the exit portion C with the trap doors D on the bottom thereof and with the door E on the outer end thereof and with the bait shelf F on the door E.

The housing, here made of sheet iron, may be built up in any suitable manner and has the entrance aperture 10 at the front end of the portion A, the exit aperture 11 at the bottom of the portion C, and the aperture for the door E at the rear end of the portion C.

At the front end, the portion A has the walls 13, each extending part way across the front end of the portion A to provide the aperture 10 which should be sufficiently large to freely admit the animal for which the trap is designed. The guide walls 14 are provided in the portion A at a suitable distance from the walls 13 and parallel therewith, the purpose whereof will appear presently.

The movable walls B are normally spaced a less distance apart than the width of the animal to be trapped and are provided with the flanges 15 spaced to fit loosely within the walls 13 and 14 so that the walls B are guided thereby and can freely move toward or away from each other. The faces 16 of the walls B are provided with the teeth 17, preferably punched out from these walls and bent outwardly and rearwardly as shown, extend inward and rearward and are, preferably, provided with a blunt point 18 to prevent injury to the pelt of the animal. These points 18 may, however, be made sharp, either pointed or flat or otherwise, when the preservation of the pelt is not important; the purpose of these walls B and the teeth 17 will appear presently.

The coil compression springs 19 extend between the walls B and the respective walls of the entrance portion, are conveniently held in position by the depressions 20 in the walls B and the depressions 21 in the walls of the entrance portion, and tend to normally hold the walls B in their innermost position but permit these walls B to move outwardly when lateral pressure is exerted thereon as will appear presently.

The exit portion C extends below the entrance portion A and is provided with the trap doors D hinged to the lower end thereof by the hinges 22. The springs 23 are only of sufficient strength to normally hold the doors D closed so that a light load placed thereon will open them.

The door E is hinged at its lower edge to the rear end of the portion C by the hinges 24 and is engaged with the lock 25.

The bait shelf F is conveniently secured to the door E as shown.

The lower projecting part of the portion C may, conveniently, extend into the receptacle G which may be arranged to either destroy the animal or to retain it in captivity.

The angle irons 27 are secured to the outside of the housing to support the trap. It is preferred that the angle irons on both sides of the housing are disposed so that one leg thereof extends upward and the bottoms thereof are flush with the bottom of the portion A to permit these angle irons to be extended to the front of the trap when so desired. It is also preferred that the angle iron on the back of the trap is disposed so that one of the legs thereof extends downward to provide a better means for securing the hinges 24 thereto.

The apparatus shown and described operates as follows: When the trap is set up as shown in the drawing with a suitable bait on the bait shelf, the animal scents the bait mainly through the entrance aperture. Since the walls B are normally spaced closer together than the width of the animal but are susceptible to outward movement due to the springs 19, the animal will squeeze its way into the trap and thereby force the walls B apart against the action of the springs 19. When, at any time, the animal attempts to retreat after it has entered the aperture, the springs 19 force the walls B against the body of the animal and the teeth 17 will then engage the pelt of the animal and prevent such retreat. When the pelt of the animal is to be preserved, it is best to provide these teeth with a blunt end so that they may engage the hair and outer surface only and press against the body of the animal; but when the animal is to be destroyed, it is just as well to have sharp points on these teeth to more readily force the animal forward into the trap.

After the animal has proceeded into the trap and before it can reach the bait on the shelf, it must step on the trap doors. As soon as it steps on one or both of these doors they will open and the animal will drop into the receptacle since there is no other support for it. It is observed that these trap doors are located some distance below the bottom of the entrance portion A so that the animal must move downward and step on these doors before it can reach the bait. This initial downward movement of the animal helps to open the trap doors as well as giving the animal a downward momentum.

After the animal has dropped through the trap doors, it drops into the receptacle and is retained therein for further disposition.

It may be noted here that the trap shown and described has no opening in the housing to admit any appreciable amount of light to the interior of the trap and is well adapted for animals which frequent dark places. When, however, a trap is to be used for animals which shun the dark, one or more openings may be provided in the housing to admit more light, or the housing may be made of wire or other open work structure instead of the solid construction shown.

In addition to the mechanism so far described, I also make use of the credulity of animals and provide the mirror H, located on the door E, opposite the entrance aperture, and secured to the door E by the screws 26.

This addition of the mirror in no wise affects the operation of the mechanism as previously described, but has the additional advantage of coaxing an animal into the trap.

When an animal first scents the bait and enters the trap, it will at once perceive its own reflection in the mirror; sufficient light for that purpose is admitted to the inside of the trap by the apertures 28 and the openings produced when the teeth 17 are punched out. When the animal so sees its reflection in the mirror, its fighting spirit is at once aroused, it will then rush at this reflection, see the reflection rush at it, will forget all thoughts of caution, and will readily and blindly drop through the trap doors.

It is noted that the apertures 28 are divided into two pairs, one pair being located near the mirror but on each side thereof while the other pair is spaced closer together and located in the entrance portion. The first mentioned pair is intended to illumine the space on each side of the mirror and to faintly illumine the space in front of the mirror so that an incoming animal can readily see the reflections therein. The second mentioned pair is intended to illumine the entrance portion more brightly than the space in front of the mirror. This difference of illumination in two spaces causes an animal in the entrance to see its own reflection in the mirror more clearly and to rush at it more readily.

In addition to the mechanism so far described, I also add the artificial animal J and the bait 29 suspended from the bait shelf F as seen in Fig. 2.

This animal J is secured to the rear wall of the exit portion C to further invite animals into the trap similar to the invitation provided by the mirror H as previously described.

It is understood that either the mirror or the artificial animal, or both, may be omitted. The trap itself, without the mirror and the artificial animal, will effectively trap animals. Such features as the mirror and the artificial animal are provided more for the purpose of enticing animals to enter the trap and to arouse their credulity and thereby increase the efficiency of the trap.

I claim:—

1. An animal trap, including, a housing provided with an entrance, at least one movable wall in said housing inside of said entrance to be moved by an animal while the same enters said trap, said wall substantially parallel with the sides of said housing when either in normal or in any moved position, and means to prevent said animal from retreating after the same has entered said entrance.

2. An animal trap, including, a housing provided with an entrance opening, a pair of longitudinal walls transversely movable inside of said opening and the outer ends thereof normally closing a portion of said opening, resilient means for moving said walls toward each other, and means on the opposing faces of said walls to prevent the retreat of an animal after the same has entered or passed said opening.

3. An animal trap, including, a housing provided with an entrance opening, a pair of longitudinal walls transversely movable inside of said opening and forming a passage way and the ends thereof normally closing a portion of said opening, resilient means for moving said walls toward each other, and means on the opposing faces of said walls to prevent the retreat of an animal after the same has entered said passage way.

4. An animal trap, comprising a housing composed of an entrance portion and an exit portion; a pair of aligned walls movable in said entrance portion and provided with inwardly and rearwardly projecting teeth, a pair of springs between each of said walls and the corresponding wall of said entrance portion to normally hold said walls in spaced relation to each other but permit said movable walls to be moved away from each other, a bait shelf at one end of said exit portion, a pair of trap doors hinged to said exit portion intermediate said entrance portion and said bait shelf normally closed and adapted to be opened by the movement of an animal in said trap to drop the same therethrough, and springs between said doors and said exit portion to normally hold said doors closed.

5. An animal trap, including, an opaque housing having an entrance at one end, a mirror on the inside of the other end of said housing opposite said entrance, a pair of openings in the top of said housing in front of said mirror and each opening at one side of said mirror, and a second pair of openings in the top of said housing near said entrance and closer together than the first said pair of openings.

6. An animal trap, including, an opaque housing having an entrance at one end and an exit adjacent and below this entrance, a mirror on the inside of the other end of said housing opposite said entrance and above said exit, a pair of openings in the top of said housing in front of said mirror and at the sides thereof to faintly illumine the space in front thereof, and a second pair of openings in the top of said housing near said entrance and closer together than the first said pair of openings to illumine said entrance and the animal entering therein.

7. An animal trap, including, an opaque housing having an entrance at one end, a mirror on the inside of the other end of said housing opposite said entrance, means for faintly illuminating the space in front of said mirror, and means for illuminating the space in said entrance and an animal therein.

AKOS J. HALL.